United States Patent [19]
Hild

[11] Patent Number: 6,088,706
[45] Date of Patent: Jul. 11, 2000

[54] SYSTEM AND METHOD FOR MANAGING REPLICATED DATA BY MERGING THE RETRIEVED RECORDS TO GENERATE A SEQUENCE OF MODIFICATIONS

[75] Inventor: Stefan G Hild, Mount Pleasant, United Kingdom

[73] Assignee: International Business Machines Corp., Armonk, N.Y.

[21] Appl. No.: 08/650,200

[22] Filed: May 17, 1996

[30] Foreign Application Priority Data

Mar. 8, 1996 [GB] United Kingdom .................. 9604987

[51] Int. Cl.$^7$ ..................................... G06F 17/30
[52] U.S. Cl. ............................. 707/202; 707/10; 709/227
[58] Field of Search .................................... 709/213, 214, 709/215, 223, 227, 228, 246; 707/10, 201, 202, 203, 204; 712/25, 27

[56] References Cited

U.S. PATENT DOCUMENTS

| | | | |
|---|---|---|---|
| 5,261,051 | 11/1993 | Masden et al. ......................... | 395/200 |
| 5,333,312 | 7/1994 | Wang ..................................... | 395/600 |
| 5,469,503 | 11/1995 | Butensky et al. ....................... | 379/265 |
| 5,490,270 | 2/1996 | Devarakonda et al. ................ | 395/600 |
| 5,608,426 | 3/1997 | Hester .................................... | 345/153 |
| 5,706,510 | 1/1998 | Burgoon ................................ | 395/619 |
| 5,774,717 | 6/1998 | Porcaro .................................. | 707/202 |

FOREIGN PATENT DOCUMENTS 0684558  3/1995  United Kingdom ............ G06F 11/14

OTHER PUBLICATIONS

Lu et al, "Improving Data Consistency in Mobile Computing Using Isolation–Only Transsactions" IEEE pp. 124–128, Sep. 1995.

Kumar, "Coping with Conflicts in an optimistically Replicated File System", IEEE, pp. 60–64, Mar. 1990.

"Consistency and Recovery Control for Replicated Files", Danco Davcev and Walter A. Burkhard, Proceedings of the Tenth ACM Symposium on Operating Systems Principles, 1985, pp. 87–96.

"An Overview of Reliability Mechanisms for a Distributed Data Base System", Michael Hammer and David Shipman, 1978, pp. 63–65.

"Compressing TCP/IP Headers for Low–Speed Serial Links", V. Jacobson, Feb. 1990.

"Combining Location and Data Management in an Environment for Total Mobility", Monica Wachowicz and Stefan G. Hild.

"Lesson 18: Working Out of the Office", *Consumer Tested 10 Minute Guide to Lotus Notes Release 3 for Windows*, Kate Barnes, 1995.

(List continued on next page.)

*Primary Examiner*—Dung C. Dinh
*Assistant Examiner*—Dzung C. Nguyen
*Attorney, Agent, or Firm*—Jerry W. Herndon

[57] ABSTRACT

A data management system and a method for managing copies of a shared data file maintained on a plurality of computer systems that are connectable via a mobile communications network. The method comprises: for each copy of the shared data file, maintaining a record of modifications made to that copy; retrieving, via connection to the mobile communications network, the records maintained for other copies of the shared data file; merging the retrieved records to generate a sequence of modification; applying predefined rules to the sequence of modifications to resolve conflicts within the sequence of modifications; and modifying the copies of the shared file based on the conflict-resolved sequence of modifications. The solution is not restricted to a particular set of applications. It improves efficiency since it retains communication autonomy from the applications. Applications need not be modified to make use of the facilities provided.

19 Claims, 4 Drawing Sheets

OTHER PUBLICATIONS

"Using Briefcase to Keep Documents Up–To–Date", "To Keep Files Synchronized by Using a Floppy Disk", "To Synchronize Files on Connected Computers", from Help files for Microsoft Briefcase in Microsoft Windows 95.

"Disconnected Operation for Wireless Nodes Position Statement", Stefan G. Hild, May 19, 1995, pp. 1–23.

"File Replication in a Mobile Environment", Stefan G. Hild and Peter Robinson, Nov. 30, 1995, pp. 1–29.

"Disconnected Operation in the Coda File System", James Kistler and M. Satyanarayanan, *ACM Transactions on Computer Systems,* vol. 10, No. 1, Feb. 1992, pp. 3–25.

SYSTEM AND METHOD FOR MANAGING REPLICATED DATA BY MERGING THE RETRIEVED RECORDS TO GENERATE A SEQUENCE OF MODIFICATIONS

FIELD OF THE INVENTION

The present invention relates to a system and method for managing replicated data, and in particular to a system and method for managing copies of a shared data file maintained on a plurality of computer systems connectable via a mobile communications network.

BACKGROUND OF THE INVENTION

Computing technology now penetrates all aspects of life, with national and international communications networks providing rapid exchange of information. However, current networks are typically still restricted by being location-fixed. While access to international networks, especially the world-spanning 'Internet', is increasingly important, it is historically restricted to the relatively sparse access points of wired networks.

The advent of mobile communication systems in the 1980s has shown that this restriction can be alleviated by the provision of a system of transmitters arranged in a cellular layout to cover large geographical areas, these transmitters using a small set of frequencies and therefore take up comparatively little bandwidth. Within this geographical coverage area communication links can be set up easily with readily-available equipment. Although this infrastructure was initially developed for voice traffic ('mobile telephone'), it has been expanded quickly to allow for data traffic as well.

Today, data connections can be established on most voice-grade mobile communications systems and several data-only networks which are in operation in various countries. An example is the recently introduced 'Global System of Mobile Telephone' or GSM for short, which provides not only pan-European coverage today, and possibly global coverage in the short- to medium-term future, but also high-quality voice traffic and data connectivity.

The business community has already accepted GSM for its international coverage. Since data connectivity can be provided through the same hardware at no additional network-cost, it is widely anticipated that the benefits of mobile data, for example e-mail, will be well received by this particular user-community given the right packaging. Hardware and software developers are currently endeavoring to provide services and applications to suit the users' needs.

There are, however, a few problems which need addressing. Due to the nature of data transmission over air much error correction is required, and thus bandwidth is limited; currently, 9600 bits per second can be achieved at maximum. At the same time, mobile data connections on networks such as GSM are billed in the same way as mobile voice connections are, i.e. they are based on connection time rather that the amount of data actually transmitted. Given the premium-priced connection charges typical for the mobile telephone industry and this low speed, the transmission of one megabyte of data currently costs around $10 worth of connection time. The slightly cheaper but also slower packet-oriented data-only networks, on the other hand, suffer from high network turnaround times (in the UK, turnaround-times in excess of 20 seconds are not unusual). Since mobile links are expensive and, for the most popular networks, charge based on connection time, applications which make inefficient use of data links are liable to waste money. The user wants to use mobile links effectively and wants to be able to control usage of expensive links.

An additional problem is that of ease of use. A number of applications are already available which, to some extent, manage mobile connections efficiently by applying advanced compression methods. Unfortunately, those applications often force the user into particular interaction patterns which are frequently not only new but also peculiar. In all cases they will give a different 'look and feel' than conventional applications. Computer practitioners are often used to a small set of applications, and are reluctant to adopt a new interface, especially when it does not replace the old design but is supposed to be used alongside of it.

Furthermore, it is still a non-trivial task to set up all communication components correctly and start up a mobile connection. Ideally, mobile applications should be similar if not identical to conventional ones, and the use of a mobile link should be as transparent as possible to the user.

Since the network internals have to be accepted as given and are beyond the influence of application developers, solutions to the various challenges and problems inherent in the use of mobile connections have, in the past, concentrated on two areas, either the application itself, or the underlying communications protocol. We will consider both of these approaches below.

Improving Individual Applications:

Numerous applications have been adapted over the past few years to run over mobile links. Programs like mail- and news-readers or WWW-browsers are particularly popular, but a large number of custom-built mobile applications (which are therefore little known to the general public) are also in use. Fine-tuning applications has the advantage that they can be customized not only for a mobile link in general, but for one specific mobile network in particular. Hence, they can make full use of the network-specific transmission characteristics and bandwidth, thus providing the best possible data-handling. On the other hand, this fine-tuning is likely to involve many modifications to low-level application code, which may lead to incompatibility with the original application and seriously hampers the portability of the application to other platforms and networks. It also leads to a serious lack of separation between the application-specific and communication-related aspects of the application. Much of the effort has to be repeated for each application.

Improvement of the Communication Protocol:

The alternative approach of attempting to improve the underlying communication protocol has the obvious advantage that it is application-independent and therefore avoids many of the pitfalls of the above approach. Fine-tuning existing protocols such as TCP/IP for mobile links (for example by applying VJ-header compression as discussed by V Jacobson in his article "Compressing TCP/IP headers for low-speed serial links", 'Request for Comment' (RFC) 1144, February 1990, or using augmented versions of TCP/IP such as 'Mobile IP' or 'Indirect TCP'), or making these standard protocols available on otherwise non-compliant networks (as for example IBM's ARTour system) has the obvious advantage that a large number of applications can benefit from the effort. It also provides a clear cut separation between the communication aspects and the application itself. Unfortunately, these communication platforms handle data generically and thus can not make use of application-specific reduction and compression methods. Hence, they serve to make applications portable and offer an optimized data-transmission subsystem but, on their own, can do little to improve the application's performance.

Obviously, both approaches can be applied to give best results by combining the strengths of both efficient data handling and efficient data transmission. In particular, this is useful for heavy-duty applications such as video or image transmission, but is not advisable in the general case since it also combines the pitfalls of both approaches.

Both approaches increase efficiency of the transmission sub-system on different levels. However, they have little to offer with regard to the two problems of 'budgetability' and 'ease of use' discussed earlier. Whilst systems have been developed which allow conventional network applications to run over mobile links by providing a standard programming environment on top of the often proprietary protocols within the mobile network, this approach has proven to be difficult in practice since conventional applications have been built on top of high-speed links and are, in general, too bandwidth-hungry to function over mobile links, or are simply too expensive to run. Neither approach can efficiently support interactive applications, where actual data transmission only represents a small fraction (often less than 1%) of the total running time of the application. This, of course, is a particularly severe limitation if used in conjunction with circuit-switched networks, where call charges are based on connection time (such as the GSM network). While a GSM connection can be disconnected if no traffic is encountered for some time, it has been found that re-establishing a modem-connection over current GSM-networks takes on average 28 seconds which makes this difficult to handle.

The object of the present invention is to provide an improved system and method for managing data replicated across a plurality of computers which communicate over a mobile communications network.

SUMMARY OF THE INVENTION

Accordingly the present invention provides a method of managing copies of a shared data file maintained on a plurality of computer systems that are connectable via a mobile communications network, the method comprising: (a) for each copy of the shared data file, maintaining a record of modifications made to that copy; (b) retrieving, via connection to the mobile communications network, the records maintained for other copies of the shared data file; (c) merging the retrieved records to generate a sequence of modifications; (d) applying predefined rules to the sequence of modifications to resolve conflicts within the sequence of modifications; and (e) modifying the copies of the shared file based on the conflict-resolved sequence of modifications.

The above invention alleviates the problems mentioned earlier by providing a generic platform which allows conventional applications to make efficient use of mobile data connections. It is generic in that it is not restricted to one application or to a particular set of applications. Further, it improves efficiency since it retains communication autonomy from the applications and is arranged to handle the data in an efficient manner. Further it is easy to use since applications need not be modified to make use of the facilities provided.

It should be noted that the reference to a 'shared' data file does not necessarily mean that there need be multiple users. The invention is equally applicable to situations where a single user 'shares' the file across different machines, for example the computer in his office and a portable computer taken by the user when working away from the office.

In preferred embodiments, said record maintaining step (a) is performed on each of the plurality of computer systems, and the plurality of computer systems are disconnected from the mobile communications network during step (a). Further, the plurality of computer systems are preferably only connected to the mobile communications network during said retrieval step (b).

In preferred embodiments, each of said steps (a) to (d) are performed on a number of said plurality of computer systems, said step (b) comprising the exchange, via connection to the mobile communications network, of the records maintained by said number of the plurality of computer systems, and said step (e) comprising the modification of the local copy of the shared file. By such an approach, only one connection to the mobile communications network is required in order to enable the local copy of a shared data file to be updated.

To assist in the automatic resolution of conflicts between modifications, in preferred embodiments priority information is stored with each modification as it is recorded during said record maintaining step (a), and at said merging step (c) the priority information is used to assign relative priorities to any conflicting modifications for subsequent resolution at said conflict resolving step (d). Preferably, the priority information stored at said record maintaining step (a) comprises the identity of the user who makes the modification. Further, in preferred embodiments, the priority information also includes time stamp information, such that an earlier modification may have a higher priority than a later modification or vice versa. However, any other suitable priority information can be stored to enable priorities to be assigned to conflicting modifications.

Given some form of prioritization of records such as described above, then in preferred embodiments, a conflicting lower priority modification is completely invalidated during the conflict resolving step (d). By employing this approach, the preservation of file format is guaranteed, but information will be lost. Alternatively, a different approach can be used where only the conflicting part of a lower priority modification is invalidated. This has the advantage of only removing the minimum amount of information necessary to derive a non-conflicting set of modifications, but may not preserve the file format. It will be apparent that other policies could be used to define how conflicts are resolved at said step (d).

For the purpose of improving the efficiency of data transfer over the mobile communications network, the records are preferably compressed prior to being sent over the mobile communications network during the retrieval step (b).

Viewed from a second aspect the present invention provides a computer system for maintaining a copy of a shared data file, copies of the shared data file also being maintained on a plurality of other computer systems that are connectable to the computer system via a mobile communications network, each computer system being arranged to keep a record of modifications made to its copy of the shared file whilst disconnected from the mobile communications network, the system comprising: retrieval means for connecting the computer system to the mobile communications network to retrieve the records kept for copies of the shared data file maintained on the plurality of other computer systems; merging means for merging the retrieved records with the record kept for the local copy of the shared data file to generate a sequence of modifications; conflict resolving means for applying predefined rules to the sequence of modifications to resolve conflicts within the sequence of modifications; and means for modifying the local copy of the shared file based on the conflict-resolved sequence of modifications.

Viewed from a third aspect, the present invention provides a data management system for managing copies of a shared data file maintained on a plurality of computer systems that are connectable via a mobile communications network, the system comprising: logging means, associated with each copy of the shared data file, for keeping a record of modifications made to that copy; retrieval means for retrieving, via connection to the mobile communications network, the records maintained for other copies of the shared data file; merging means for merging the retrieved records to generate a sequence of modifications; conflict resolving means for applying predefined rules to the sequence of modifications to resolve conflicts within the sequence of modifications; and means for modifying the copies of the shared file based on the conflict-resolved sequence of modifications.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

Figure 1:
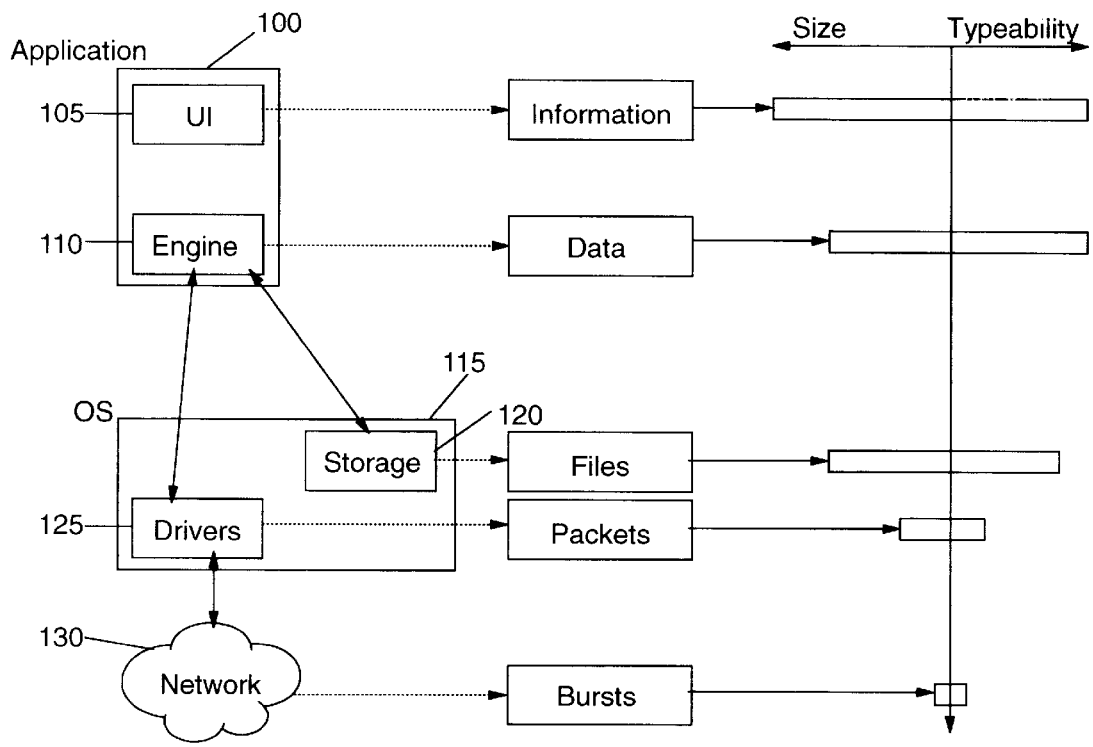
FIG. 1 illustrates the different software components within a data communication system.

FIG. 1 provides a rudimentary classification of the different software components within a data communication system. The application 100 is divided into its user interface ('UI') 105 and the application's engine 110. On the operating-system level 115, a very crude distinction is made between the storage system 120 and the operating system's drivers 125 for external components. The network 130 sits underneath and is driven by the operating system 115. The middle column of FIG. 1 classifies the data associated with the different components, together with, on the right, typical indications of the size of the data handled by each component and its typeability, that is, the detail to which type information can be inferred by looking at the data unit.

Whilst data at the application level is handled in large chunks which can easily be typed, size as well as typeability steadily decrease at the lower levels. Finally, at the protocol level ('Drivers') data is handled in small chunks ('Packets') where it is difficult to infer type information.

Ideally, mobile communication would be handled on a layer low enough to allow a large number of applications to benefit and high enough to give insight into the type of data being transmitted to allow the use of specialized compression and reduction methods. According to the preferred embodiments of the present invention, mobile communication is handled at the file-system level, since most application programs use files for data input and output, so a broad spectrum of applications can benefit. Files also comprise data-units rather than pieces of data, and thus, the file-type can often be inferred. Furthermore, it has been realized that continuous connection is not required during normal operation, since all applications can operate on data available locally, thus allowing reasonable support for interactive applications; connections are only required occasionally to re-synchronize the files.

In the area of wired ('terrestrial') communications networks, as opposed to mobile communications networks, some distributed filing-systems have been developed. Network file systems such as Sun Microsystems Inc's Network File System (NFS), or the Andrew File System (AFS) from Transarc Corp, are used on wired networks to gain access to data files held at remote nodes. Thus, local applications can work on data held at remote sites and files can be shared between many users. Effectively, the use of a network is entirely hidden from the user, who sees all files as local. In the simplest form, these systems operate by redirecting read/write operations across the network using some sort of remote procedure call facility. Caching is often used to reduce traffic load on the network.

When simultaneous editing is allowed, conventional file systems make use of various locking methods to ensure data consistency. Voting has been proposed instead of locking, but write-access is still restricted to one site which has to obtain write-permission for sufficiently many copies prior to accessing a file. Many systems use tokens to coordinate access to replicated files, but the passing of tokens again requires communication links to be operational between the sites. In the article "Consistency and recovery control for replicated files", Proceedings of the 10th ACM Symposium on Operating Systems Principles, December 1985, Davcev and Burkhard have proposed a system which allows write-access when the network is partly disconnected, but only within the so-called 'majority-partition'. In the article "An overview of reliability mechanisms for a distributed data base system", Proceedings of the spring COMPCON, February 1978, Hammer and Shipman have proposed a technique which does not require locks for write-operations and therefore allows files to diverge slightly but relies on the communication links to resolve the resulting inconsistencies within tight time constraints.

Lotus Notes allows multiple read/write replicas of its special database. Replicas are periodically reconciled, usually no more than once or twice a day. Detection of a conflict between replicas causes the creation of separate versions with no attempt to automatically resolve the conflicts, this resulting in significant manual burden whenever a conflict occurs. A different approach is discussed in European Patent Application EP-A-0,684,558, which describes a replication system in which a plurality of servers maintain updatable replicas of a file. An update propagation protocol is used, which is described as "aggressive" in that it causes a replica update as soon as possible after a failure leading to inconsistent data has been identified. In effect, the servers coordinate amongst themselves to detect replica inconsistencies and initiate an update protocol to detect stale or conflicting replicas without waiting for a client request for data. Although some conflicts are resolved automatically, manual intervention may be required to repair conflicting files.

More recently, Microsoft Corporation has released a 'Briefcase Folder' facility as part of its Windows-95 product. This facility provides conflict resolution facilities for applications that are written on top of the briefcase facility, and hence is only applicable to that subset of applications.

Further, it does not initiate reconciliations automatically and requires significant manual guidance.

The above file system level techniques are not suitable for a mobile environment due to their reliance on fast, continuously available communication links and/or their liberal use of locking methods which seriously hampers prolonged periods of disconnected operation.

Figure 2:
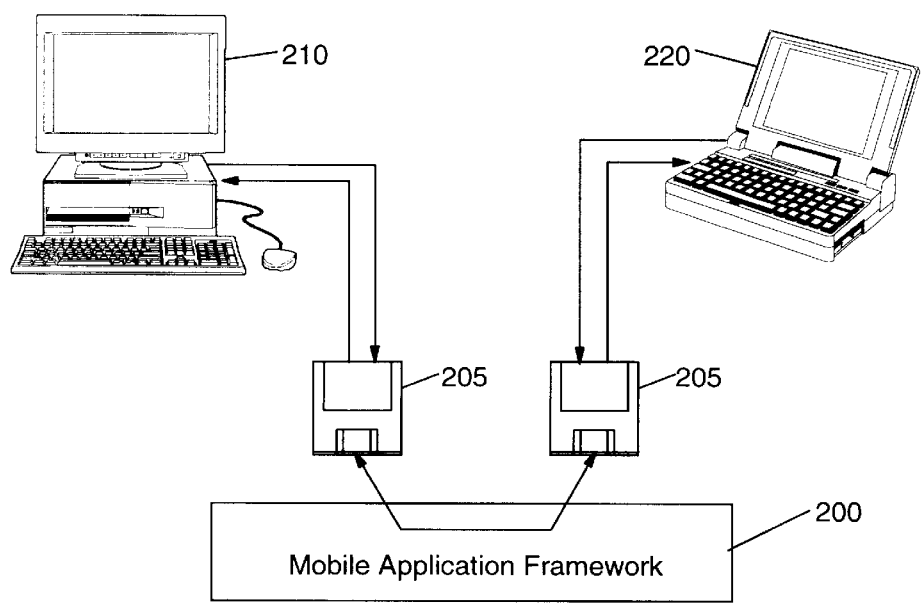
FIG. 2 illustrates the data management system of the preferred embodiment of the present invention.

FIG. 2 illustrates the set-up of the data management system of the preferred embodiment, which will be referred to hereafter as the 'Mobile Application Framework' 200. In the FIG. 2 example, both users 210, 220 operate locally with local copies of the shared file (represented by the disk-symbol 205), while the framework 200 underneath endeavours to keep both copies synchronised. It is important to note that with this framework it is no longer the applications that communicate or initiate transmissions, but the underlying framework.

Some file systems, notably 'CODA' (see the article "Disconnected Operation in the Coda File System", ACM Transactions on Computer Systems, 10(1), February 1992, by J Kistler and M Satyanarayanan), are now being extended to allow disconnected operation for periods of networks being down and thus make a step in this direction. Additionally, the article "Combining Location and Data Management in an Environment for Total Mobility" by Monica Wachowicz and Stefan Hild, Proceedings of the International Workshop on Information Visualization and Mobile Computing, Rostock, Germany, February 1996, describes a 'total mobility' architecture, in which a user no longer carries his portable computer with him/her but instead will register with a rented computer at his/her destination. As part of this architecture, a disconnected operation is contemplated, in which data is manipulated in disconnected mode by applications running on the mobile host. Changes to the data file are stored to facilitate later reconciliation with other copies of that file. A first outline of the data management subsystem forming part of the total mobility architecture was presented by Stefan Hild in the position statement "Disconnected Operation for Wireless Nodes", published in the Proceedings of the ECOOP '95 Workshop on Mobility and Replication, European Conference on Object Oriented Programming, August 1995. This paper briefly describes the general concept of disconnected file access and reconciliation within a mobile environment.

The 'Mobile Application Framework' takes the view that disconnected operation (i.e. no connection is established with the stationary host) is the norm and that connected periods are the exceptions, rather than vice versa. Consequently, the 'Mobile Application Framework' of the preferred embodiment differs in many ways from conventional network file system and those allowing disconnected operation, as will become more apparent from the more detailed description which follows.

In preferred embodiments, the 'Framework' is used as a tool for sharing a small number of files of primary importance between a small number of users. Setting up such a 'work-group' is a simple but conscious process. By taking this careful approach to the concept of 'sharing', the 'Framework' can afford to take a much loser stance on file consistency. Hence, the 'Framework' is neither a replacement nor an extension to conventional network file systems but facilitates the management of replicated files. Some of its main features will now be discussed in more detail.

As outlined above, the Framework relies heavily on disconnected operation. The state-diagram in FIG. 3 indicates the different modes of operation and also outlines the state of connectivity with the rest of the network.

During normal (disconnected) operation, the Framework is in 'Log'-mode (step 300). During this period, all modifications executed on the shared files are recorded and stored in logs. No restrictions are in place regarding the access to shared files: both read- and write-operations are supported on all nodes sharing the same file simultaneously.

On reconnection, the Framework re-establishes connection to some number (not necessarily all) of the other sites holding copies of the shared file and exchanges, at step 310, the recorded logs with those sites. This is the only step requiring network connectivity ('Exchange').

The three remaining states serve to re-synchronise the shared file. Initially, the logs received from the other sites and the local log are merged at step 320 into a unique sequence of modifications ('Merge'), then conflicts are resolved ('Resolve') at step 330, and finally the files are brought into line with the merged and resolved log at step 340 ('Rerun').

Figure 4:
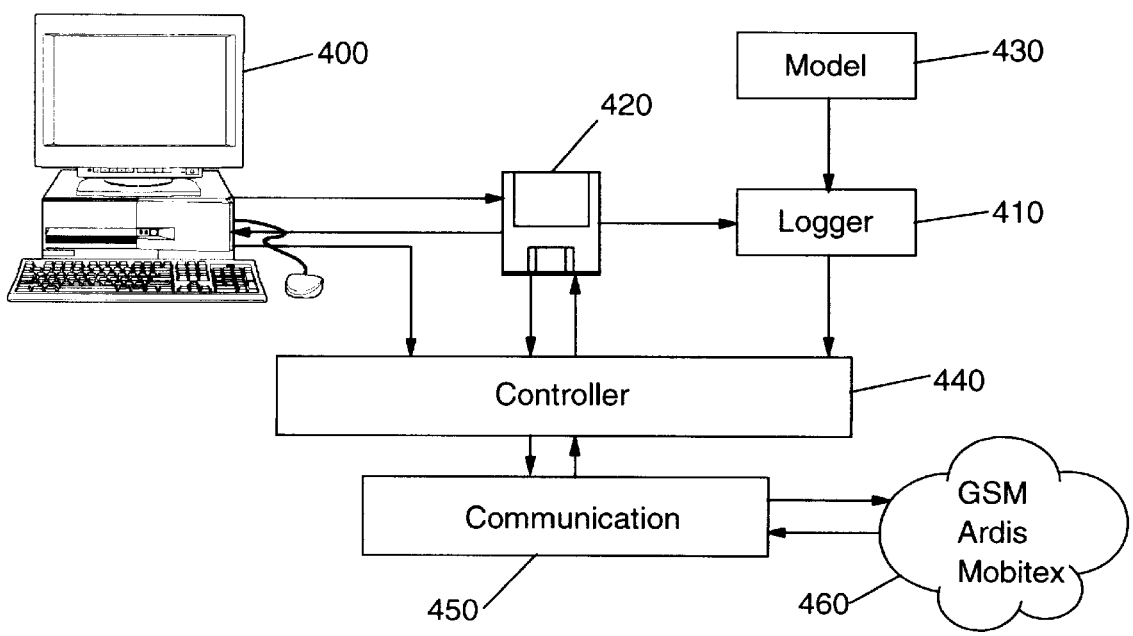
FIG. 4 is a diagram showing the components of the Mobile Application Framework of the preferred embodiment of the present invention.

FIG. 4 illustrates the internal components of the Framework and also gives some justification for its name. Rather than providing a platform for a mobile application to run on, it also consists of components which run on the same level as the application (especially the logger 410) and thus provides a 'framework' for the application to run in. In detail, the different components are the logger 410, which logs all modifications executed on the local copy of the shared data file, the file being represented by the disk 420 in the figure. The logger 410 has available a number of models 430 which are formal descriptions of contents-type and possible edit-operations for various file-types to assist the detection of modifications. Defaults are available which have been designed to work with any file-type. These models will be discussed in more detail later.

The controller 440 comprises most of the logic and is responsible for initiating reconciliations (i.e. sending the reconnection event) and for guiding the reconciliation process. Finally, the communication module 450 handles the actual interfacing with the underlying mobile communications network 460.

In preferred embodiments, each of the above mentioned elements of the Mobile Application Framework are contained on each computer system 400 that is maintaining a copy 420 of the shared data file. Each time the controller 440 on a particular computer system 400 determines that the copy of the shared data file should be resynchronised with other copies of that data file, it will establish a connection via the mobile communications network 460, and will exchange the recorded modification logs with other computer systems maintaining recorded modification logs. Steps 320, 330 and 340 of FIG. 3 will then be performed by that controller 440 to update the local copy 420 of the shared data file.

However, it will be apparent to those skilled in the art that the controller 440 and communication module 450 could be located on a separate dedicated computer system. Each system maintaining a copy of the shared data file could then contain the other elements of the Mobile Application Framework in order to log changes made to that copy of the file. Periodically, the controller 440 could connect to computer systems 400 over the mobile network to retrieve the logged changes made by those systems to their copies of the shared file. Steps 320 and 330 could then be applied by the controller 440 to merge the copies and resolve conflicts. Then the controller 440 could reconnect to the network in order to send the conflict-resolved sequence of modifications to each computer system 400. Step 340 would then be applied by each computer system 400 in order to update the local copies of the shared file.

In preferred embodiments, this latter approach is not used, since it involves connecting to the network twice in order to update a copy of a shared data file, and this increases the overhead of the operation. Further, since the controller would be located on some central machine, details about the number of changes being made to any particular copy of the shared data file will not be available, and so the controller would have to decide when to update the files based on some other criteria, eg time elapsed since last update. This may not be as efficient as basing update operations on the actual change activity to the copies of the shared data files, which can be done when using the system of the preferred embodiment. However, the latter approach does have the benefit that only one controller is involved, and so determination of when to exchange copies of the files is managed centrally. Hence, in some instances, it may be decided that the latter approach is worth employing.

Whichever approach is used, it is apparent that given prolonged periods of disconnected operation in the absence of any form of locking, conflicts are likely to arise between highly dynamic shared files. Hence, the Framework trades consistency for availability. The divergence of files and the inconsistencies arising is not a problem unique to the Framework; to a lesser degree any distributed system suffers from these, and much work has been done both in the field of conflict detection and version-merging. However, all prior art techniques either resort to user interaction to resolve conflicts once they have been detected, or avoid conflicts in the first place. Most use locking or derivatives of it. However, for the Framework, it is clear that any form of locking is out of the question due to the long periods of disconnected operation.

Regarding the resolution of conflicts, it is clear that, when no semantic meaning can readily be associated with the files it is very difficult to resolve conflicts intelligently. While most approaches rely on the user to resolve conflicts manually, it is believed that disconnected operation will only be acceptable to the user if conflicts can be resolved automatically. It should be clear that the automatic conflict resolution cannot be expected to produce a logically coherent result in all imaginable cases. However, it is expected that the reconciliation will produce a file that can be worked with. In the case of text-files, we hope to derive a file which can easily be 'cleaned up' manually. In the case of data-files, the reconciliation process should preserve the file-format in such a way that the application program accessing the file is still able to read it.

Hence the Framework of the preferred embodiment requires a file logging and conflict detection method which does not impose any restrictions regarding the read- and write-access to files while in disconnected operation on the one hand, and logs enough information to allow a reasonable automatic conflict resolution on the other hand.

According to preferred embodiments of the present invention, in the first instance, files within the Framework are considered as a sequence of characters. While carefully avoiding any assumptions regarding the contents-type of the file, modifications are logged by periodically comparing the current file with a backup-copy held by the logger and computing a first approximation to the 'edit-distance'. The edit distance is a sequence of edit operations which converts a first string into a second string, and thus essentially identifies how the user has modified the file. However, this is difficult and expensive to compute, and in preferred embodiments of the present invention, a first approximation to the edit distance is used, since it is simple and cheap to compute, and has been found to provide acceptable results.

According to this approach, two atomic operations are defined, namely the 'insertion' and 'deletion' operations. The logger aims to model any changes realised to the logged file in terms of a sequence of these operations. Preferably this is done by comparing the two strings (ie current and backup files) from either end, and determining the first and last character position where the two strings differ. From that, an inference is made as to whether an insertion, a deletion, or a deletion followed by an insertion, has been performed.

Further, all modifications in the log are timed, thus providing the bases for automatic conflict resolution later. Models may be available to customise the logging process and the edit-operations available for special file-formats. For example, the logging process can be modified by altering a file type definition within the model 430, such that for instance it may contain information that instructs the logger 410 to split the file into pieces and to then consider each piece individually.

For the automatic resolution of conflicts two questions must be answered:

Firstly, it is necessary to assign a priority to each modification so that, given two conflicting modifications, one will overwrite the other. This priority assignment is typically based on the location of the file copy; some file-systems which allow disconnected operation define a 'master-copy' which, in the case of any conflicts, has priority over all other copies. This approach is not taken in preferred embodiments since it is believed that users are likely to change between machines in which case it would not be sensible to bind the priority of a modification to the location at which it was executed. Instead, the preferred embodiment assigns priority-levels based on the identity of the user who modifies the file. The time-stamps recorded with the modifications are also used to assign priorities. The view that early modifications over-rule later ones is preferably adopted, since the opposite policy would lead to the counter-intuitive situation that modifications have a greater chance of committing successfully the later they are executed.

Secondly, the handling of conflicting modifications has to be defined. Two policies have been found to be particularly useful in preferred embodiments of the present invention. With the 'Total Invalidation Policy', the conflicting lower-priority modification is completely invalidated. This may lose much information, but is guaranteed to preserve the file format. Alternatively, a 'Partial Invalidation Policy' can be defined which only discards the conflicting part of the lower-priority modification. Obviously, this has the advantage of only removing the minimum amount of information necessary to derive a non-conflicting set of modifications, but may not preserve the file format.

Figure 5:
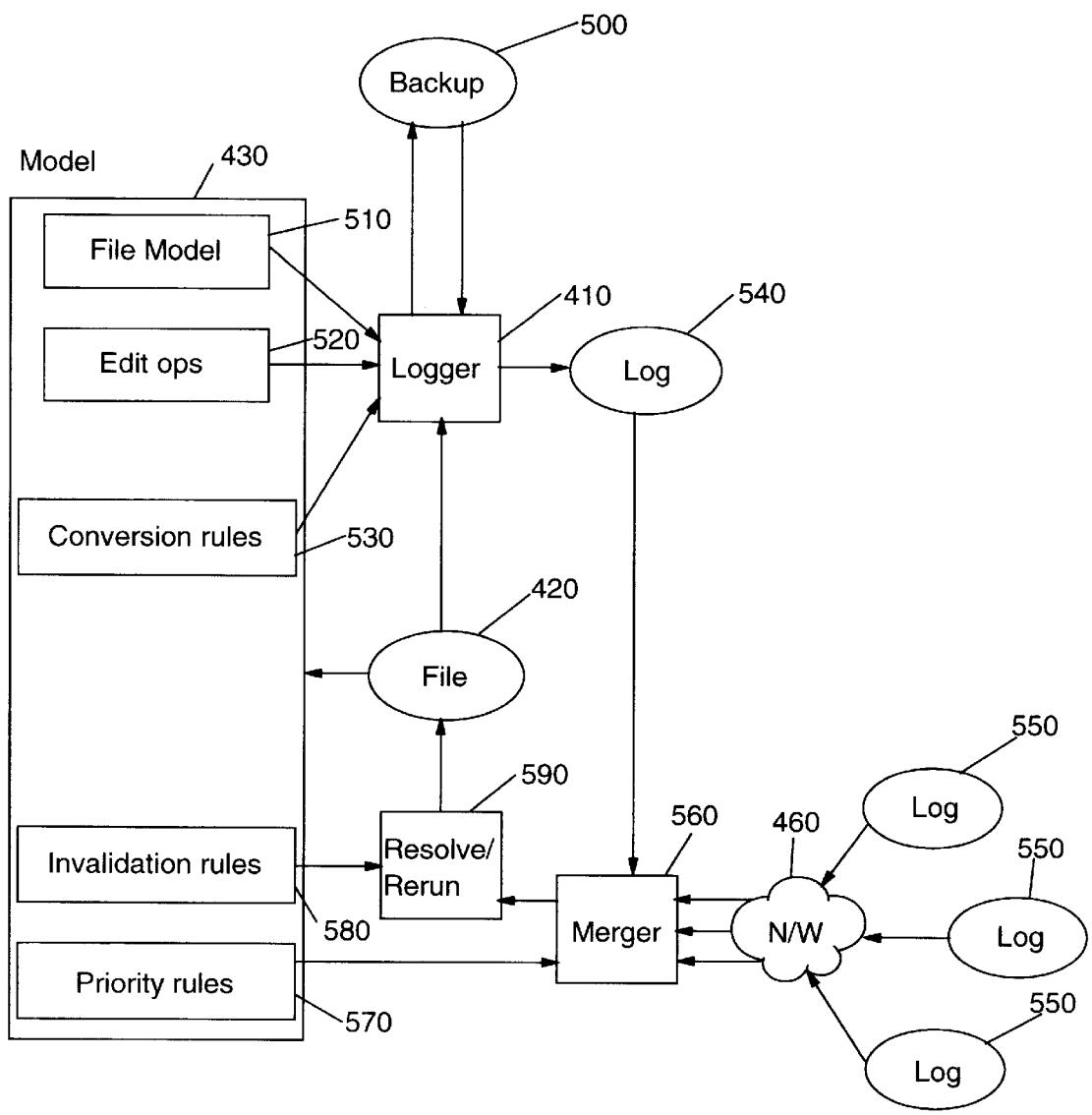
FIG. 5 is a diagram illustrating how the various components of the model are used in the preferred embodiment of the present invention.

Within the framework, both the priority assignment rule and the invalidation policy can be defined, globally, by the user within the model 430. FIG. 5 gives an overview of this customisable component ('Model') within the reconciliation process. The logger 410 periodically compares the user's data file 420 with a back-up file 500 and determines the modifications executed by the user. For this purpose, it has available a 'file model' 510 describing the outline of the file format, a set of 'edit operations' 520 which may be executed by the user, and finally a set of conversion rules 530 to translate these edit operations into a sequence of default INSERT and DELETE operations. The 'file model', 'edit operations' and 'conversion rules' can be used to guide the logger 410 for special file types and formats; by default the logger 410 of the preferred embodiment relies solely on INSERT and DELETE operations and assumes a flat file format.

The modifications detected in this fashion are stored in a log 540. At reconciliation time, logs 550 which are being received over the network from other copies of the same file are merged by the merger 560 in order of priority using a set of 'Priority Rules' 570. 'Invalidation Rules' 580 are then applied by the resolving/rerunning means 590 to detect and remove any conflicts in the merged set of modifications. Finally, the merged and reconciled log is executed on the local file copy 420. In a similar manner to the logging process, defaults are available for both the merging and the reconciliation. However, the user may decide to customise both processes by supplying a set of alternative 'Priority Rules' and/or 'Invalidation Rules'.

The set of all customisable parts forms the 'Model' 430. Models may be defined for a set of files, for example all files of a specific file type, or for a particular file.

Figure 3:
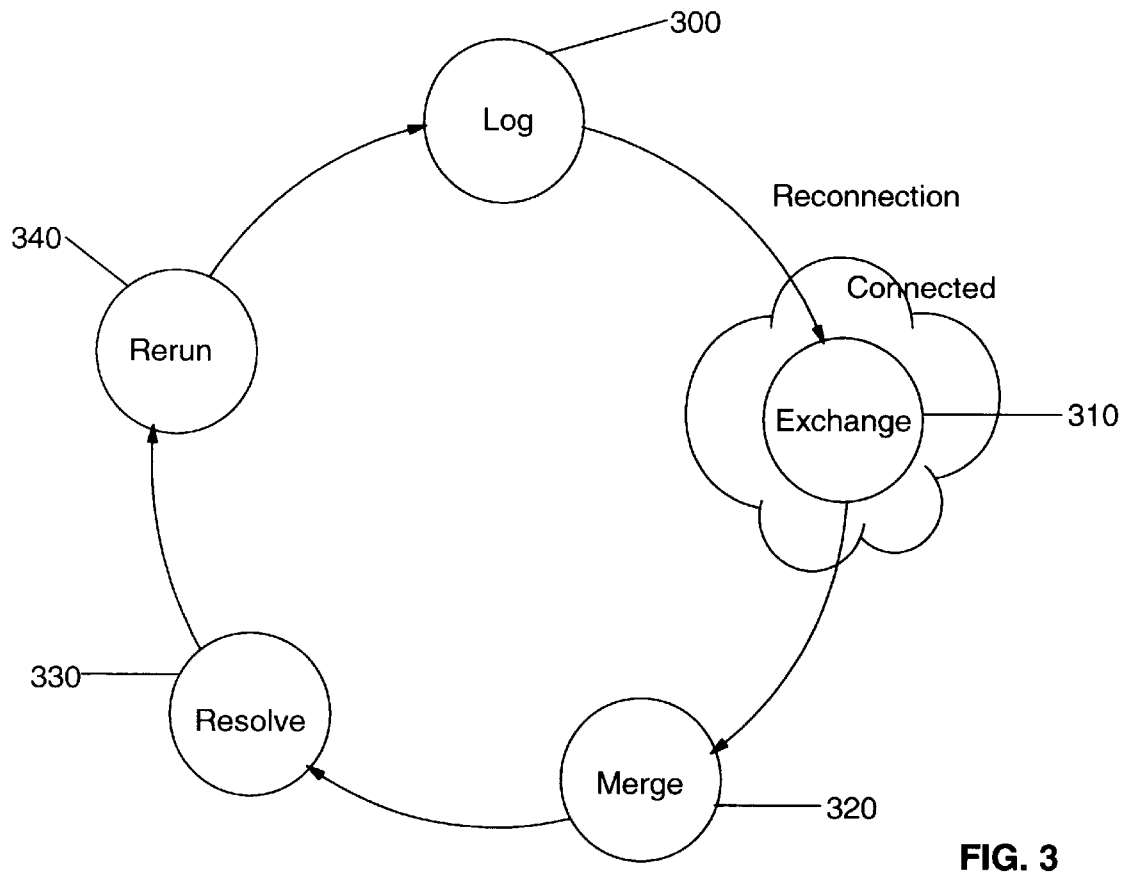
FIG. 3 illustrates the different modes of operation of the Mobile Application Framework of the preferred embodiment of the present invention.

Within the paradigm of the Framework, data transmissions are not initiated by applications but within the Framework itself, namely by triggering a reconciliation process, as illustrated in the state-diagram of FIG. 3. Hence, communication consists of the controlled exchange of modifications executed on files with known file-type. Prior to transmission the data contained within the logs can in preferred embodiments be optimised at various levels:

Firstly, lossless compression methods can be applied. This is straightforward and can be done with little or no penalty; most communication subsystems already apply some form of dictionary-based compression method at the packet-level. The compression achieved by these techniques is modest.

Secondly, the type-information can be exploited and specialised compression methods can be applied. Depending on the exact file-type, these lossy compression methods can be by magnitudes more efficient than lossless methods, but are generally more expensive to apply.

Finally, data can be re-scaled to reflect the abilities of the remote node. For example, a high-resolution image file is rescaled to reflect the pixel- and colour-resolution. All information necessary to re-generate the full resolution image is left at the original site with a pointer to it from the remote node in case the full resolution image needs to be regenerated, for example if it is to be passed on the another high-resolution node.

It is one of the primary goals of the Mobile Application Framework that existing tools and programs can be used. However, by nature these cannot offer any support for framework-specific functions such as file reconciliation. We therefore envisage that applications can be written which are 'framework-aware' and have access to framework-internal information which may be used to assist the user in framework-specific functions. For example, modifications that have failed during the process of a reconciliation can be saved and, if required, restored. Modifications executed by other users can be marked. Thus, they can make the reconciliation process more transparent and help to restore data that would otherwise be lost.

Figure 6:
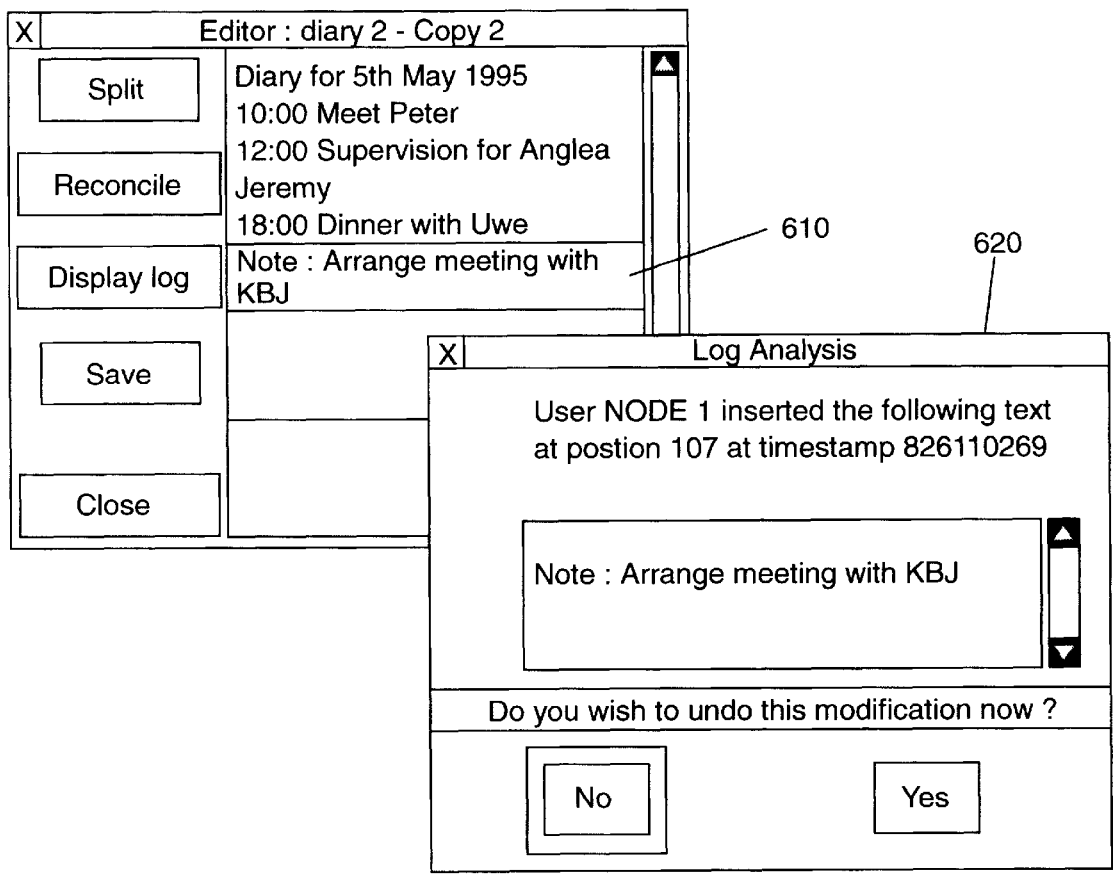
FIG. 6 is a diagram showing a screen view of a 'framework-aware' application that may be used in association with preferred embodiments of the present invention.

As an example, a simple framework-aware ascii-text editor can be considered (see FIG. 6). It allows the user to 'see' which modifications have been carried out during the reconciliation process by marking the modified areas using a colour-code 610 which directly corresponds to the source of the modification (deletions and failed modifications are indicated by inserting an artificial marker into the text at the appropriate positions). By clicking on these markers the user can retrieve additional information 620 on this modification and can, if required, reverse its effect. FIG. 6 shows an example screen shot. With this, the user is given a simple tool to rescue data that may otherwise be lost during the reconciliation process. The resulting user interface is information-rich without being perceived as overloaded.

From the above description, it is apparent that the Framework of the preferred embodiment comprises all communication aspects in a single module within its structure (see FIG. 4). This not only provides a clear separation between the communication-oriented aspects and functionality-oriented modules of the framework itself but also between the communication on one side and the applications running within the framework on the other. Communication is no longer initiated by the applications but by the framework. By concentrating all communication operations in one place it becomes possible to tightly control all communication, a task that would be impossible if a set of applications drove communication on their own behalf independently.

A second important distinction between conventional communication systems and the Mobile Application Framework is the reason why communication is initiated. In conventional systems, applications communicate to exchange information and data with other sites to ensure continuous operation; data is exchanged on an 'on demand'-basis. Within the framework, data is held locally so no communication is required to keep applications operational. However, data kept locally is bound to grow out of date and the framework initiates communication solely to update the data files. This means that communication is not bound to a schedule dictated by the pace of running applications, as is the case if interactive applications, for example, rely on external data to continue operation. Instead frequency and timing of reconciliation and synchronisation connections can be varied widely. The exact timing may be determined by a number of factors:

Log-driven updates. For each file, the amount of divergence tolerated at any one time may be specified in terms of logged modifications. If more modifications have been executed (i.e. the weighted aggregate length of all modifications exceeds some specified limit) a reconciliation process is triggered. So-called 'pipeline-files' can be established which have an extremely low amount of tolerable divergence, which effectively means that each change to the file is immediately propagated to all other sites. These files can be used as a convenient message-exchange facility between sites.

Periodic updates. All sites may connect at periodic intervals. This makes sure small modifications are propagated eventually, even if the critical threshold to trigger a log-driven update is not exceeded.

Current network costs and availability. Conditions to trigger reconciliations may be relaxed during off-peak hours while network connections are available at a cheaper rate or while cheaper networks are available. For example, it is conceivable that the node may actually be connected to a free wired network connection for certain periods of time so reconciliations can be executed permanently. Then, the Framework effectively operates like a conventional 'Network File System'. Changes are propagated immediately to all copies and conflicts are consequently unlikely. In the other extreme, reconciliation steps may be delayed if mobile data channels are detected to be of poor quality, resulting in high error rates, many retransmissions and consequently high transmission costs.

Update-on-Demand. Some critical applications require up-to-date data. Reconciliations can therefore be requested by applications and are served by the Framework normally immediately. Obviously, these applications have to be written as Framework-aware applications.

It is envisaged that the user will be able to define a certain monetary budget which can be used up by the framework for reconciliations. This is possible by monitoring typical modification patterns and by varying reconnections accordingly.

The above description describes the Mobile Application Framework of the preferred embodiment, this being a generic system which allows standard applications to make use of mobile data links in a budgetable and controllable manner. This is achieved by adding support for disconnected operation on file system level. The problem of diverging files due to unrestricted access during long period of disconnected operation is solved by using loggers which create detailed modification histories for each replicated file, allowing fully automatic conflict resolution. Although a generic algorithm can never be expected to produce optimal results in all imaginable cases, the resulting files could always be worked with and cleaned up manually if necessary.

It is likely that sharing individual files between several users will occur far less frequently than replicating files on different machines for the same user. For example, the file-space of a large stationary desk-top machine may be mirrored via the Framework on a small mobile note-book. In these cases, the user will be faced not only with the same working-environment on both machines, but also with the same application. Therefore, the Framework is inherently easy to use. With the Framework the use of even a slow mobile data connection can be made transparent to the user.

The positioning of the Framework at the file-system level allows the communication sub-system to make use of type information which can be inferred easily by applying specialised compression and reduction methods to files prior to transmission.

Furthermore, by containing all communication aspects in one module and under the control of a single component, transmissions can be monitored easily and due to the benefits of disconnected operation the transmission frequency can be varied widely allowing the budgetability of transmission costs.

I claim:

1. A method of managing copies of a shared data file maintained on a plurality of computer systems that are connectable via a mobile communications network (460), the method comprising:

a) for each copy (205, 420) of the shared data file, maintaining a record (540) of modifications made to that copy;

b) retrieving, via connection to the mobile communications network (460), the records of modifications (550) maintained for at least some of the copies of the shared data file;

c) merging (560) the retrieved records to generate a sequence of modifications;

d) applying predefined rules (580) to the sequence of modifications to resolve conflicts within the sequence of modifications; and e) modifying at least one copy (205, 420) of the shared file based on the conflict-resolved sequence of modifications.

2. A method as claimed in claim 1, wherein said step (a) is performed on each of the plurality of computer systems, and the plurality of computer systems are disconnected from the mobile communications network during step (a).

3. A method as claimed in claim 2, wherein the plurality of computer systems are only connected to the mobile communications network (460) during said retrieval step (b).

4. A method as claimed in claim 1 or claim 2 or claim 3, wherein each of said steps (a) to (d) are performed on a number of said plurality of computer systems, said step (b) comprising the exchange, via connection to the mobile communications network (460), of the records (550) maintained by said number of the plurality of computer systems, and said step (e) comprising the modification of said at least one copy (420) of the shared file.

5. A method as claimed in claim 1 or claim 2 or claim 3, wherein priority information is stored with each modification as it is recorded during said step (a), and at said step (c) the priority information is used to assign relative priorities to any conflicting modifications for subsequent resolution at said step (d).

6. A method as claimed in claim 5, wherein the priority information stored at said step (a) comprises an identity of a user who makes the modification.

7. A method as claimed in claim 6, wherein the priority information stored at said step (a) comprises time stamp information, used to determine priorities of conflicting modifications.

8. A method as claimed in claim 7, wherein during said step (d), a conflicting lower priority modification is completely invalidated.

9. A method as claimed in claim 7, wherein during said step (d), only the conflicting part of a lower priority modification is invalidated.

10. A method as claimed in claim 1 or claim 2 or claim 3, wherein during said step (b), the records are compressed prior to being sent over the mobile communications network (460).

11. A first computer system for maintaining a copy (420) of a shared data file, copies of the shared data file also being maintained on a plurality of other computer systems that are connectable to the first computer system via a mobile communications network (460), each first one other computer system being arranged to keep a record (540, 550) of modifications made to its copy of the shared file while disconnected from the mobile communications network (460), the system comprising:

retrieval means (440, 450) for connecting the first computer system to the mobile communications network (460) to retrieve the records (550) kept for copies of the shared data file maintained on the plurality of other computer systems;

merging means (560) for merging the retrieved records (550) with the record (540) kept for the first computer system (420) of the shared data file to generate a sequence of modifications;

conflict resolving means (590) for applying predefined rules (580) to the sequence of modifications to resolve conflicts within the sequence of modifications; and means (590) for modifying the copy (420) of the shared file in the first computer system based on the conflict-resolved sequence of modifications.

12. A data management system for managing copies of a shared data file maintained on a plurality of computer systems that are connectable via a mobile communications network (460), the system comprising:

logging means (410), associated with each copy (420) of the shared data file, for keeping a record (540, 550) of modifications made to that copy;

retrieval means (440, 450) for retrieving, via connection to the mobile communications network (460), the records maintained for at least some of the copies (420) of the shared data file;

merging means (560) for merging the retrieved records to generate a sequence of modifications;

conflict resolving means (590) for applying predefined rules (580) to the sequence of modifications to resolve conflicts within the sequence of modifications; and means (590) for modifying at least one copy (420) of the shared file based on the conflict-resolved sequence of modifications.

13. A system as claimed in claim 12, wherein the plurality of computer systems are only connected to the mobile communications network whilst the retrieval means (440, 450) is retrieving modification records.

14. A system as claimed in claim 13, wherein priority information is stored with each modification as it is recorded, and the merging means (560) is arranged to use the priority information during the merging process to assign relative priorities to any conflicting modifications for subsequent resolution by the conflict resolving means (590).

15. A system as claimed in claim 14, wherein the priority information stored with a modification comprises the identity of the user who makes that modification.

16. A system as claimed in claim 14 or claim 15, wherein the priority information stored with a modification comprises time stamp information, such that an earlier modification has a higher priority than a later modification.

17. A system as claimed in claim 14 or claim 15, wherein the conflict resolving means (590) is arranged to completely invalidate a conflicting lower priority modification.

18. A system as claimed in claim 14 or claim 15, wherein the conflict resolving means (590) is arranged to invalidate only the conflicting part of a lower priority modification.

19. A system as claimed in claim 14 or claim 15, wherein the records are compressed prior to being sent over the mobile communications network (460) to the retrieval means (440, 450).

* * * * *